Sept. 25, 1962 A. BARKMAN ET AL 3,055,600
BATCH SMALL-BALL BALL MILL FOR DISPERSING
PIGMENTS IN LIQUID VEHICLES
Filed Jan. 14, 1959 6 Sheets-Sheet 1

INVENTORS
AARON BARKMAN
MIKE S. FUJIMOTO
BURNHAM R. ORVIG

BY Richard G. Smith
ATTORNEY

INVENTORS
AARON BARKMAN
MIKE S. FUJIMOTO
BURNHAM R. ORWIG
ATTORNEY

INVENTORS
AARON BARKMAN
MIKE S. FUJIMOTO
BURNHAM R. ORWIG
BY [signature] ATTORNEY Sept. 25, 1962 A. BARKMAN ET AL 3,055,600
BATCH SMALL-BALL BALL MILL FOR DISPERSING
PIGMENTS IN LIQUID VEHICLES
Filed Jan. 14, 1959 6 Sheets-Sheet 5

INVENTORS
AARON BARKMAN
MIKE S. FUJIMOTO
BURNHAM R. ORWIG
By
ATTORNEY

Sept. 25, 1962    A. BARKMAN ET AL    3,055,600
BATCH SMALL-BALL BALL MILL FOR DISPERSING
PIGMENTS IN LIQUID VEHICLES
Filed Jan. 14, 1959    6 Sheets-Sheet 6

INVENTORS
AARON BARKMAN
MIKE S. FUJIMOTO
BURNHAM R. ORWIG

BY
their ATTORNEY

United States Patent Office 3,055,600
Patented Sept. 25, 1962

3,055,600
BATCH SMALL-BALL BALL MILL FOR DISPERSING PIGMENTS IN LIQUID VEHICLES
Aaron Barkman and Mike S. Fujimoto, Chicago, and Burnham R. Orwig, Crete, Ill., assignors to The Sherwin-Williams Company, Cleveland, Ohio, a corporation of Ohio
Filed Jan. 14, 1959, Ser. No. 786,746
8 Claims. (Cl. 241—172)

This invention relates to a combination mixer, ball mill and reducing vessel useful to produce dispersions of pigments in liquids, primarily for protective and decorative coatings use and in commercial batch size operations.

In a copending application U.S. Serial Number 786,783 filed of even date herewith, we have described an improved continuous small-ball ball mill useful to produce similar dispersions, and this continuously, from a premixed coarse fluent slurry of pigment and liquid. While such unit is advantageous under conditions where large quantities of a standard dispersion are produced day in and day out, in the protective and decorative coatings and related industries, for example, paints and inks, the products manufactured are of a highly specialized formulation, each product of which may be specially formulated to meet varying but exacting demands of a particular end use and individually varying modes of application. Thus, a large proportion of the liquid dispersions of pigments in vehicles of varying quality, from pigment-in-water dispersions to pigment-in-film-forming varnish solids dispersion must be produced in batch lots varying in quantity from five to five hundred gallons per unit order. Such orders, obviously, are not adaptable to continuous production milling units.

Heretofore, one of the most economically favorable methods for preparing batches of fluent dispersions of a pigment in a vehicle was by conventional ball-milling of the pigment and liquid vehicle together in suitably sized cylindrical vessels, in which units the containant vessels were rotated slowly about their horizontal axes while loaded with steel balls or flint pebbles of, for example, one inch to several inches in diameter in intimate contact and admixture with a pigment-vehicle combination. This equipment is referred to herein as a conventional ball mill and the process as conventional ball milling. Dispersion times of the order of from 6 hours to 100 hours were required to de-agglomerate and disperse (loosely but popularly referred to as "grind") the pigmentary products into the liquid vehicles to a sufficient fineness to be acceptable for particular end uses. Additional steps of unloading and paint thin-down require operator and equipment time of an hour more or less depending upon condition of operation.

The object of this invention is to provide an improved small-ball ball mill capable of use in original mixing, grinding or dispersion, as well as thinning down, in ordered and uninterrupted sequence of batches of dispersions of pigmentary solids in liquids which improved mill and method reduces the time of manufacture from periods exceeding ten hours on the average in conventional ball-milling to the order of considerably less than sixty minutes in a large number of cases with the mill of this invention. As it is well known that the rapidity of dispersion depends on the quality of the pigment as well as the quality of the vehicle, in exceptional cases which require as much as ninety hours of standard or conventional ball mill time, six to eight hours may be required to obtain the same "grind" in the batch small-ball ball mill of this invention. The extremes noted are generally illustrative of the spread in time required, which as indicated, depend upon the qualities of the components in any particular combination.

A further object of this invention is to provide an improved small-ball ball mill of novel combination which can be used to manufacture dispersions of pigmentary solids in liquids including water, volatile organic solvents and in liquids having film-forming solids.

A still further object of this invention is to provide an improved ball mill utilizing particulate nodular grinding media as balls, said media having a particle diameter of greater than 0.85 mm. but less than 1.68 mm. and transferring kinetic energy to said balls by means of a single perforated impeller disk rotated at a peripheral velocity of at least 2500 ft./minute and preferably above 3000 ft./minute within a chamber of base restricted but upwardly expanding dimension. Such chamber is referred to herein broadly as of funnel-form and also as of substantially frustro-conical origin. By the term frustro-conical is intended to include conical volumes defined by planes which intersect and cut both regular and irregular cones both parallel to the cone base as well as by planes inclined to each other in accordance with accepted dictionary definition. The inset piece fashioned to be welded within a cylinder to provide the funnel-form bottom as shown in the drawings FIGS. 1 through 4 may be referred to as "an offset transition piece" as shown in "Sheet Metal Work" by Neubecker, plate II, page 72 (1941), American Tech Society Publication of Chicago, Illinois. The shape so formed in the cylinder may also be referred to as an inverted truncated cone. The chamber or vessel thus provided is further characterized by the fact that the rate of volume increase when liquids are metered into said vessel is proportionately greater than the rate of depth increase during such step. The containant vessel may be further defined as having a base plate of curvilinear periphery wherein the geometric form of said vessel is developed upwardly from said base plate in such fashion that the area of the base plate is less than the area of any corresponding section formed by passing a plane parallel to said base plate through any point in said vessel above said base plate and within the area defined by the intersection of said plane with the upwardly extending walls of said vessel. The energy imparted to the particulate media is then utilizable first over a relatively small volume to produce a coarse pigment-liquid slurry, then over a larger volume to disperse the slurry of agglomerated pigment solids in a portion of liquid vehicle to a fineness of a different order than the slurry and finally over the total volume to produce a completed thinned-down product by incorporation into the substantially completely dispersed pigment-liquid base the other minor quantity additives essential to the ultimate liquid product. Thus, in the milling device of this invention the energy imparted per unit volume is tailored to the energy demand of the particular operation. No equipment is presently known which can accomplish the volume transitions as possible with the present invention.

Another object of the invention is to eliminate wear and blinding or plugging of a readily removable and replaceable separatory screen which functions to separate the final liquid dispersion from the ancillary particulate or nodular grinding media and to retain the same within the mill volume.

Other objects will be apparent from the drawings in conjunction with the accompanying description. Referring in general to the drawings.

Figures 7, 8:
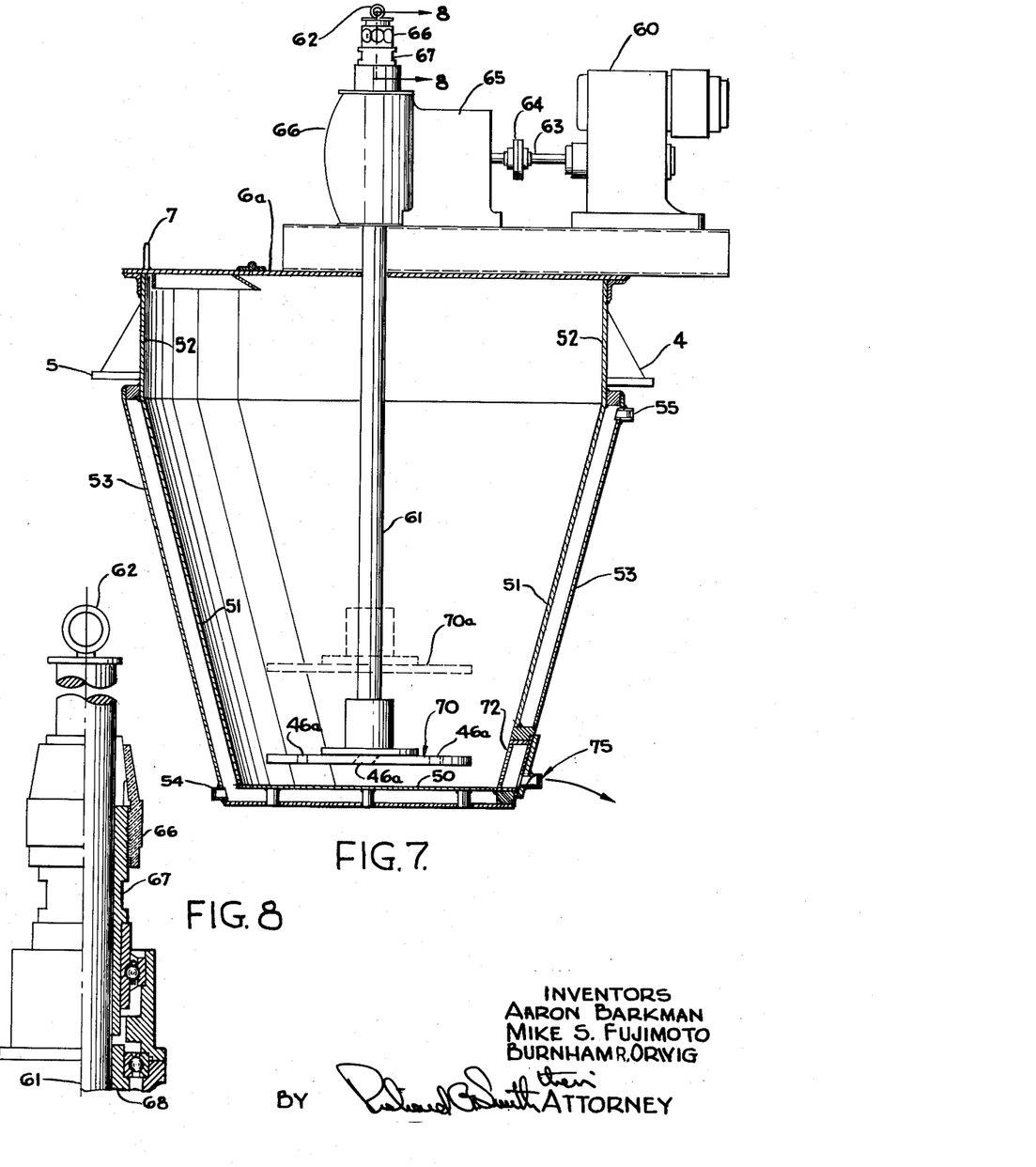
FIGURE 7 is an enlarged sectional side view of an alternative form of the invention similar to FIGURE 3.
FIGURE 8 is an enlarged view of certain detail along the line 8—8 of FIGURE 7, partially in section and with certain parts broken away.
Figure 9:
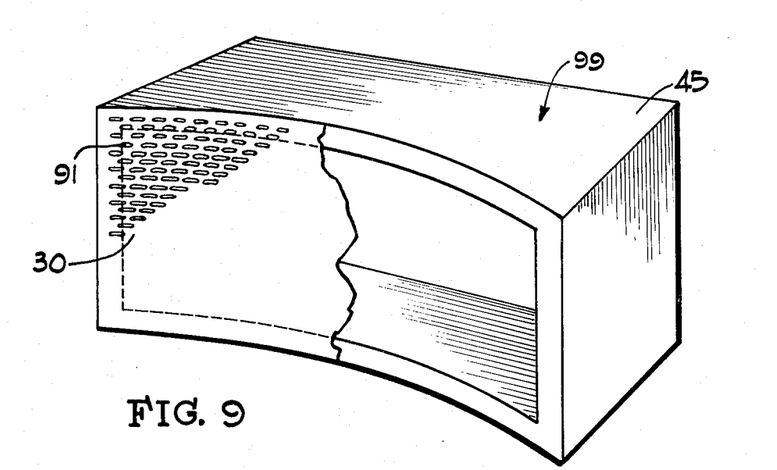
FIGURE 9 is an enlarged isometric view of the screen holder frame and screen as shown in FIGURES 3, 6 and 7 with parts broken away.

Referring specifically to the drawings, FIGURES 1–4 represent an early specific embodiment of the invention wherein a more or less standardly available tank was adopted by cutting and welding in certain parts to provide the elements in combination essential to the present invention. FIGURE 7 illustrates another embodiment showing an alternative form of the invention in certain of its particulars, utilizing a mill body or vessel specifically constructed for the ends of the invention.

Figure 1:
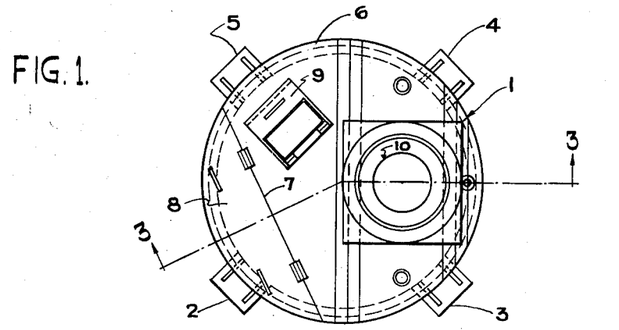
FIGURE 1 is a plan view.
Figure 2:
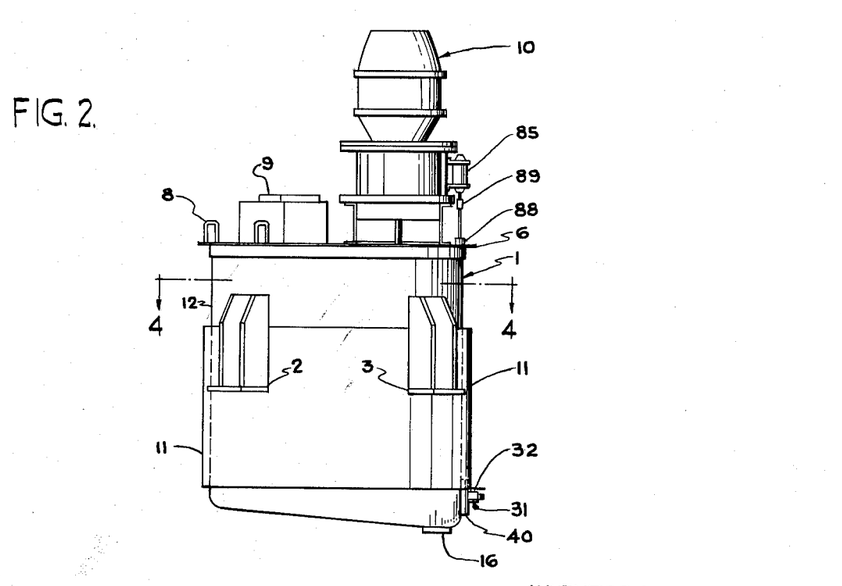
FIGURE 2 is a side elevation.

In general the batch small-ball ball mill as shown in FIGURE 1 and FIGURE 2 comprises a standard jacketed tank 1 having a plurality of floor mounting brackets 2, 3, 4 and 5. The top of the tank is closed with a plate 6 split along its diameter having a gear head motor 10 mounted above one fixed side. The other side of plate 6 is cut along chord 7 and hinged to provide a lift flap door 8. A smaller door 9 also provides ingress means into the interior top portion of mill tank 1.

A jacket 11 provides cooling means for thermal control of the interior of tank 1, and because of the particular method of producing the frustro-conical construction of the interior base, volume 22 is provided further with passageways 15 through wall 12 of tank 1 so that cooling fluids may be circulated entirely about the working volume of the mill. Ingress for cooling fluids are provided at 16 and egress means at 17.

The interior of mill 1 originates in a base plate 20 of curved periphery, preferably circular. From the base plate 20 upwardly and outwardly diverging side wall 21 forms a substantially frustro-conical or funnel-formed bottom chamber 22 which conjoins with vertical sidewall 12 forming the top section of frustro-conical chamber bottom 22. While base plate 20 is circular, and it is preferably so, it is not entirely essential as other curved areas are also operable.

A motor drive unit 10 mounted on the fixed half of top 6 provides means of suspending driven shaft 25, and is so selected and geared as to drive perforated disk impeller 26 coaxially affixed to shaft 25 at its lower end through hub 27 at a peripheral rate of at least about 2500 ft./minute and preferably above 3000 ft./minute. The rate of speed of the impeller disk is important in maintaining maximum self-cleaning action upon the interior surface of separatory screen 30. Inoperability over extended periods in prior art devices is due to problems of particulate grinding media separation from the dispersed liquid and to problems primarily associated with screening.

An important aspect of the present invention resides in the discovery that the area of the separatory screen 30 in relation to the mill volume is of but minor importance. Heretofore in the art it has been deemed essential to commercially practical mill output that the screen area extend substantially completely about the mill unit volume in which dispersion is effected. In order to accomplish this end, separatory screens in the bottom of the mill were built in and surrounded with a tire-like circular liquid collection chamber exterior of the screen area. Problems so introduced include plugging or blinding of the screen with particulate material, screen wear and difficulty of its replacement. Screen through-put in prior art devices became so difficult to overcome that later modifications shifted the separatory screen to the top of the mill but still completely about the mill periphery. Other problems were and are inherent in this recent attempt to solve the difficulty. Screen problems have been eliminated almost completely by utilizing the combination of elements as herein described.

As the energy input into the mill as described herein is extremely high, and normal mill use in manufacture causes rapid wear of separatory screen 30 and in some instances blinding of the screen with the nodular grinding media during the discharge cycle, this problem has been met by providing screen cover plate 80 which may be moved in accordance with the phase of the process.

Screen cover plate 80 is vertically movable from the raised position shown to the dotted position 83 and returned by simple hydraulic means. Vertical movement is provided by operation of hydraulic cylinder 85 operating through coupling 89, vertical rod sections 84 sliding through bushing 88 in cover 6 and guide 86 within the mill vessel 1 through rod sections 84 attached to screen cover plate 80. Coupling 89 provides for easy rod section 84 replacement.

In mill operation, screen cover plate 80 is moved to dotted position 83 during initial mixing, dispersion, thinning and shading and is only lifted to the position as shown (80) during the mill unloading cycle. At this time, valve 31 is opened and energy from impeller disk 26 transferred to the grinding media and to the dispersion liquid forces discharge of the liquid product through the outlet of valve 31 and retention in the mill of nodular particulate grinding media.

A perforated disk impeller 26 is suspended slightly above mill base 20 and in this modification of the invention, off-center of the mill and opposite separatory screen 30. In preparation for use, the frustro-conical bottom 22 of the mill 1 is partially filled with particulate grinding media to the extent that the impeller disk 26, when at rest, is covered with the media. Illustratively, in one mill having about 125 gallon capacity, 15 to 30 gallons of glass beads or 12 to 20 gallons of steel shot were used with excellent results. The ratio of the volume of the glass or steel media to the active mill volume is not particularly critical but is always less than 1:2 for example.

Figure 3:
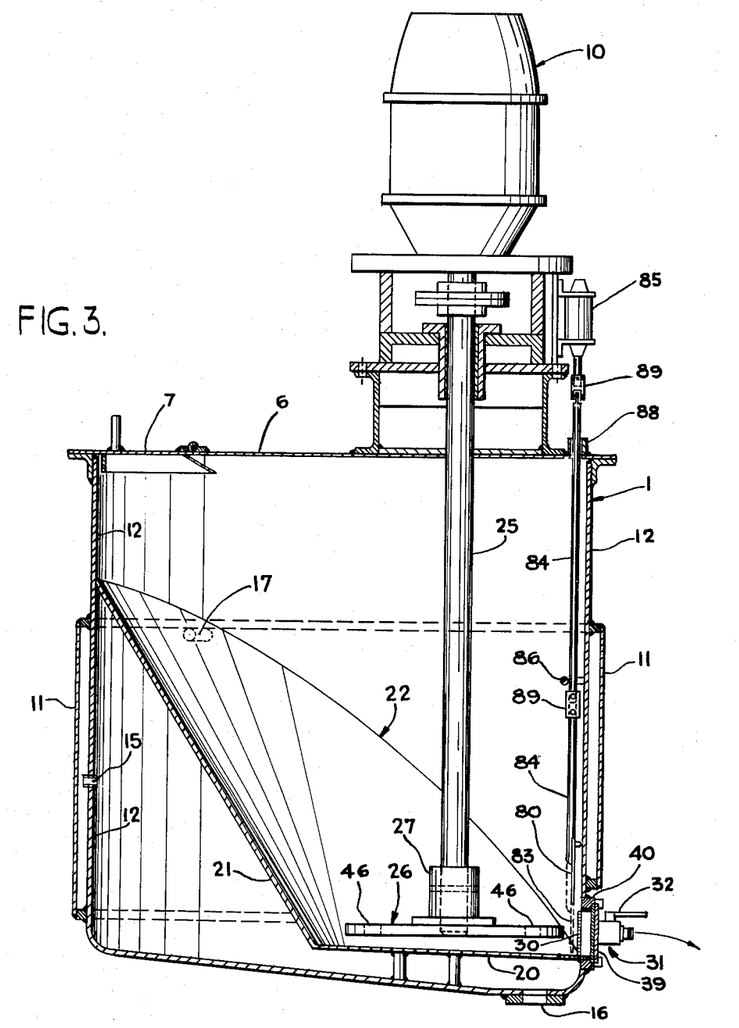
FIGURE 3 is an enlarged view along the line 3—3 of FIGURE 1, partially in section.
Figure 4:
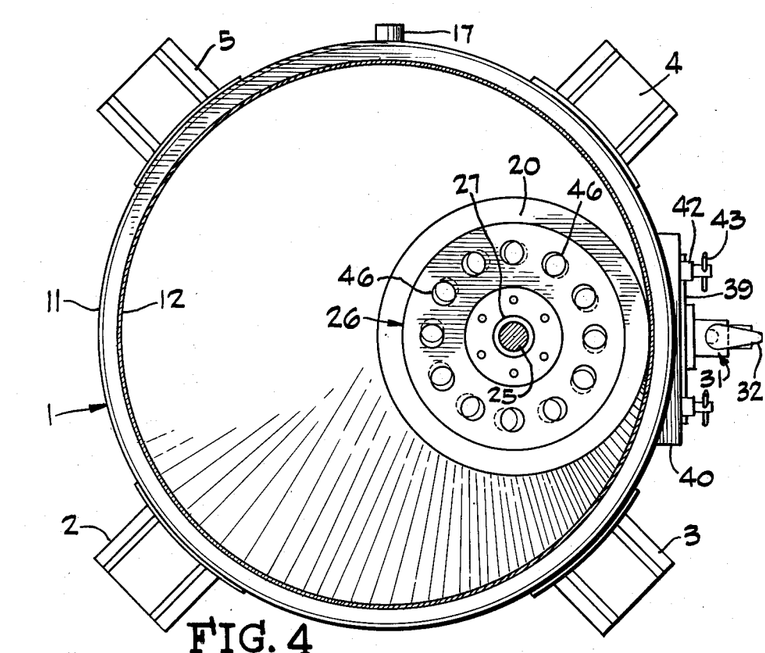
FIGURE 4 is an enlarged sectional view along the line 4—4 of FIGURE 2.
Figure 14:
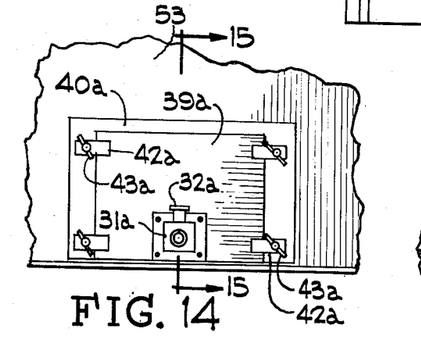
FIG. 14 is an enlarged front elevation of FIG. 7 with parts broken away corresponding substantially with FIG. 5.
Figure 15:
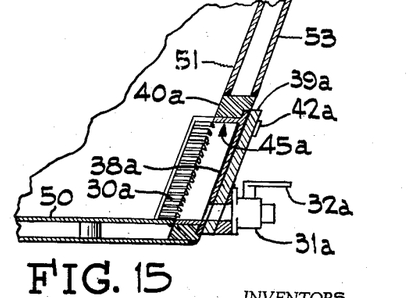
FIG. 15 is a partial sectional view along the line 15—15 of FIG. 14 with parts broken away and corresponds substantially with the elements of FIG. 6 modified as required to be adapted to use in FIG. 7.

An alternate modification of the invention is illustrated in FIGURES 7, 8, 13, 14 and 15 wherein the frustro-conical or inverted truncated cone bottom chamber has been designed specifically for small-ball ball mill purposes. Here a circular bottom plate 50 meets with upwardly and outwardly divergent continuous side wall 51 which is of frustro-conical development. The vessel may be said to be of funnel form. Conical side wall 51 terminates in a true cylindrical wall 52 which is covered with a cover plate 6 similar to FIGURES 1–3. In this modification motor 60 is horizontally mounted on plate 6a and vertical impeller shaft 61 terminates in its upper end in swivel ring 62 which can be hooked to a chainfall. Impeller shaft 61 is driven from motor 60 through motor shaft 63, coupling 64, gear reducer 65, a pinion gear and a spiral bevel gear (not shown) which is attached to quill shaft 68. Quill shaft 68 is vertically keyed to impeller drive shaft 61 on and by a long key and keyway in shaft 61 (not shown). Shaft 61 is then adapted to be raised or lowered as desired. This is accomplished by holding flat collar 67 while loosening threaded collet 66 allowing shaft 61 to be raised or lowered along the length of its keyway. Perforated disk impeller 70 may then be raised from the position shown in solid lines to dotted position 70a. Thus, an alternative means is provided of separating the impeller disk 70 from direct influence upon the separating screen 72. FIGURES 14 and 15 detail discharge chamber 75 as indicated in FIG. 7. Aside from obvious modification, the elements detailed in FIGS. 4, 5 and 6 as they apply to the modification of the invention shown in FIGS. 2 and 3 are substantially similar in construction and purpose as the elements detailed in FIGS. 14 and 15 as they apply to the invention as illustrated in FIG. 7.

In manufacture of liquid dispersions utilizing the modification of the invention illustrated in FIGURE 7, shaft 61 is lifted by a chain-fall acting through swivel ring 62 to a position such that impeller disk 70 is above the screen area 72.

While the impeller disk is in this position coarse mixing of the pigment-in-liquid, fine dispersion of pigment-in-liquid, thinning and shading of the batch is accomplished in ordered sequence of operation. Upon readying to separate the particulate grinding media from the thus prepared fluent dispersion, collet 66 is loosened, shaft 61 dropped along the keyway within quill shaft 68 to impeller position as shown at 70. Collet 66 is re-tightened about shaft 61 and its key and keyway and with discharge outlet 75 opened, impeller disk 70, acting on the particulate nodular grinding media and the fluent dispersion, forces the dispersion through screen 72 and out through egress outlet 75. By this technique, wear and blinding of separatory screen 72 is materially reduced.

Figure 5:
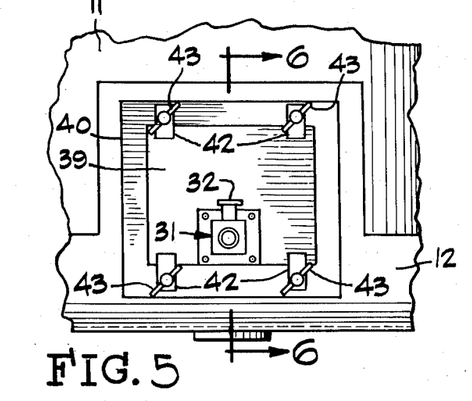
FIGURE 5 is an enlarged front elevation with parts broken away.
Figure 6:
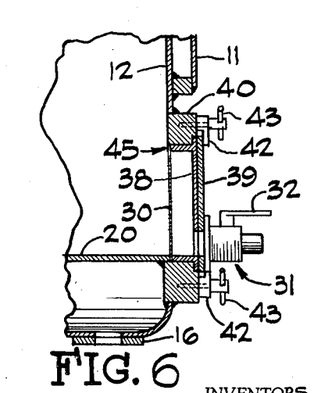
FIGURE 6 is a partial sectional view along the line 6—6 of FIGURE 5 with parts broken away.

Referring to FIGURES 5 and 6, an open square frame of rectangular section 40 is welded to side wall 12 (or 51) of base frustro-conical chamber 22 of the mill unit. Frame 40 defines a passageway from the ball mill interior to the exterior of frustro-conical lower chamber 22. A recess 41 in the exterior face of frame 40 is adapted to seat vertical plate 38 welded to and a part of separatory screen 30 frame 45. The lower part of plate 38 is drilled through as shown. A second vertical plate 39 is similarly drilled and to it is welded, or otherwise attached, a hollow exterior chamber 31 having within its interior a valve 32 which may be opened or closed to control flow through separatory screen 30 and conduit chamber 31. In assembly, separatory screen frame 45 is seated within the recess 41 and is held in this position by vertical plate 39 held against plate 38 by means of four clips 42 tightened in place by thumb screws 43.

Separator screen 30 may be constructed in a variety of ways and is of less critical nature than in the continuous mill provided in our copending application previously referred to. However, more trouble-free operation and less maintenance will be experienced utilizing a screen having horizontal slots as illustrated in FIGURES 9, 10, 11 and 12, the length 93 of which slots 91 are at least about ten times the opening width 92 and the open or screen opening area is less than 40% and preferably of the order of 20 to 30% of the total screen area.

Figures 10, 11:
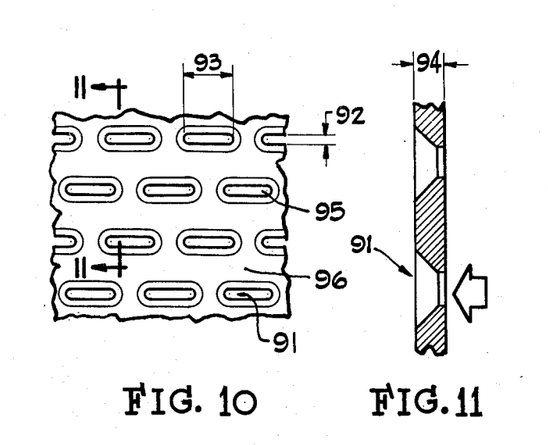
FIGURE 10 is an enlarged rear view of the screen as broken away from FIGURE 9.
FIGURE 11 is a further enlargement of a section of the screen as shown in FIGURE 10 along the line 11—11.
Figure 12:
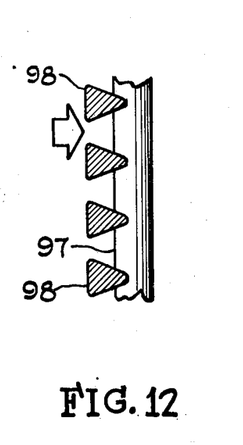
FIGURE 12 is an enlarged sectional view of a modification of the screen in section illustrated along a line as shown and illustrated in FIGURE 11.
Figure 13:
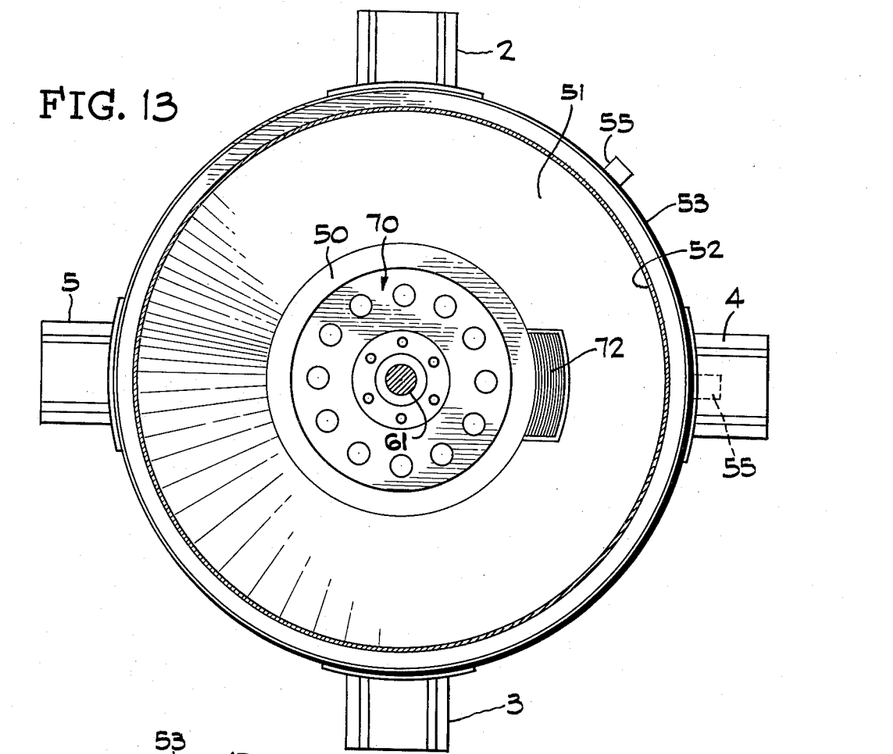
FIG. 13 is a sectional view substantially along a horizontal line passing through the supports 4—5 of FIG. 7.

In one modification as shown in FIGURE 10, the thickness of the screen is approximately the same as the slot width and the open area of the screen to the closed plate area of the screen is of the order of 20 to 30% of the total screen area. By way of contrast the usual screen of woven origin is of the order of 45% to 50% open area. The individual screen openings, in section as in FIGURES 11 and 12, are pyramidal so that while each slot is of generally rectangular shape, the opening is smaller on the ingress side of the screen than it is on the egress side. The slot width, obviously, bust be smaller than the diameter of the particulate grinding media, and the differential between the slot width and the average diameter of the media is critical and should not be less than 0.35 mm. and preferably between 0.42 and 0.67 mm. As the gradation in size from one side of the screen to the other is understood to be obtained through electroplating techniques, a variety of abrasion resistant metals may be used to produce the durability in the screen structure required. Screen blocking or blinding during discharge is held to a minimum if the slots in the screen are horizontal and the speed of the impeller is in excess of 2500 ft./minute.

Another screen as shown in section in FIGURE 12, constructed from lengths of wires of triangular cross-section welded together by means of vertical stays at right angles thereto, back of the screen face (on the egress side of the screen) to provide almost infinitely long slots, but slot widths of the order of 0.35 mm. has shown promise in adaptation to the problem of providing an operative separatory screen and provides a useful screen form.

The perforated impeller disks 26 and 70 are fabricated so that there are a plurality of cylindrical holes which are preferably equidistantly centered from the impeller disk center and evenly spaced about the periphery of the disk. Impeller disk 26 is cylindrically perforated to provide holes 46 whose axes are parallel to the axis of impeller shaft 25 and provide a most practical method of perforation, though not as efficient as in the case of disk 70 where the cylindrical perforations 46a have axes skew to the axis of impeller shaft 61 forming elliptical shaped intersections with the top and bottom faces of the impeller 70. The trailing edge of the ellipse of the top face in this modification slopes downwardly and rearwardly from the top face of the impeller, preferably at an angle of about 45 degrees.

The importance of the perforations of the impeller disks has been shown in our copending application U.S. Serial No. 786,783 as to production rate. In the batch mill the turnover and residence time is correlatively decreased with perforated impellers. Additionally water-pigment slurries may be processed and discharged, where without disk perforations this could not be heretofore accomplished.

The nodular particulate grinding media may be selected from a variety of materials, illustratively glass, fused alumina and steel shot varying in specific gravity from about 3.5 to 7.5 plus. Sharp sand is not useful as it breaks down to contaminate the dispersion being processed. To avoid plugging or blinding of the separatory screen (30 and 72) it is desirable that the particle diameter be held within a range of at least 0.85 mm. but not above about 1.68 mm. in diameter (and a correlative impeller peripheral speed above about 2500 ft. per minute). As observed in conventional ball mill practice, the greater the density of the grinding media, the more rapid the rate of dispersion of pigment in a liquid to a given particle size (generally expressed in accordance with a Hegman gauge reading in the paint industry).

Particle sizes of grinding media below about 0.85 mm. tend to give difficulty in separation of a completed dispersion from the media itself and screen blinding is intensified. In general, the same limitations found in our copending application U.S. Serial No. 786,783 filed of even date herewith and incorporated herein by reference are applicable in relation to the separatory screen, the perforate impeller disk, the grinding media and the peripheral rate of the disk impeller. The volume of grinding media useful in the batch mill is somewhat less than in the continuous mill, however, as in the batch mill only a single impeller is utilized. In the mill of this invention residence time of material being processed is considerably longer than in the continuous unit. In the batch mill of this invention the volume of grinding media should be sufficient to at least cover the impeller disk when the apparatus is under static conditions. With high density (steel shot) grinding media the rate of dispersion is increased and less volume than is used with low density (glass beads) although both glass and steel shot can be utilized advantageously. The volume of the grinding media in relation to the total active mill volume is not critical, but good judgment cannot be dispensed with in its determination in any given mill design as herein described.

With the mechanical features of our mill set forward as above, the following examples are included to demonstrate the particular advantages over the prior art in manufacture of several standard production dispersion of pigments-in-liquids.

In a unit of about 125 gallon capacity and of the general section as shown in FIGURE 3, a series of batches of different quality liquid dispersions were produced using in one instance 25 gallons of glass beads (Test A), in a second 17½ gallons of steel shot (Test B) and for control, a similar product in similar quantity was made in a steel ball mill of conventional design operated in a conventional manner (Test C). The formulations, test manufacturing methods and comparative results are set out below.

EXAMPLE I

*Iron Oxide Shading Base*

(TEST A)

37 gallons of a linseed oil modified alkyd containing about 25% oil
0.6 gal. of butanol
0.35 gal. lecithin were weighed out and placed in the mill. To this liquid, while under agitation with a perforated impeller operating at a peripheral speed of 3100 ft./minute was added:
622 pounds iron oxide
10 gallons xylol After 8¾ hours a grind of 7H (Hegman gauge) was obtained.

(TEST B)

In the same mill, utilizing 17½ gallons of steel shot of similar particle size range to the glass beads, an identical procedure as in Test A was followed. A 7H grind was obtained in 7 hours.

(TEST C)

A conventional ball mill was loaded with the identical charge above shown and rotated 30 hours to obtain a fineness of 7H. The mill loss (the amount of non-recoverable) was higher than by Test methods A and B.

EXAMPLE II

*Maple Wiping Stain*

(TEST A)

3½ gallons of a rosin-tung oil varnish containing 21% oil
15½ gallons of mineral spirits were loaded in a mill as previously identified
6 pounds zinc stearate
6 pounds sodium salt of the di-octyl ester of sulfo-succinic acid were incorporated in the liquid. To the liquid was then added:

45 pounds iron oxide
20 pounds burnt sienna
60 pounds ferrite yellow
and agitation at 3100 ft./minute impeller speed continued for 15 minutes to a 5H grind.

The dispersion was thinned with addition of

10½ gallons rosin-tung oil varnish
33 gallons mineral spirits
27 gallons V. M. & P. naptha and
6⅓ gallons Black Japan drier (TEST B)

Identical to Test A, with the exception noted. Time to 5H grind 10 minutes.

(TEST C)

Following the above formula and conventional ball milling procedures an equivalent product was prepared in a conventional steel ball mill. Time of grind—5 hours.

EXAMPLE III

*Preparation of a Metal Primer*

(TEST A)

26¼ gallons of a dehydrated castor oil alkyd varnish containing about 22% of oil (50% solids) (1)
⅝ gallon guiacol (18.3% solids)
⅛ gallon lecithin 14 gallons naptha were loaded in the mill (as hereinbefore described) and subjected to agitation at about 3100 ft./minute peripheral speed. To the liquid was added:

130 pounds $TiO_2$
60 pounds ferrite yellow
60 pounds chrome yellow
35 pounds zinc yellow
88 pounds talc
44 pounds calcite In 1¼ hours the dispersion was reduced to a 6H grind. The batch was thinned out with addition of 39 gallons additional varnish (1), 7¾ gallons naptha, ⅞ gallon n-butanol and ½ gallon 6% cobalt naphthenate drier.

(TEST B)

A repeat of the above, but the 25 gallons of glass beads replaced with 17½ gallons of steel shot. Time of complete manufacture—¾ hour.

(TEST C)

Repeat, but ball mill under conventional pattern of ball mill use. Time to complete—10 hours.

EXAMPLE IV

*Enamel Preparation*

(TEST A)

10 gallons of a linseed oil alkyd varnish containing 29.3% oil on the resin solids (50% solids) (1)
2 gallons 6% lead drier
2 gallons guiacol (18.3% solids)

were poured into the small-ball batch mill as described herein. To this liquid under agitation as in previous examples were added:

28 pounds $TiO_2$
15½ pounds Chinese blue
2 pounds phthalocyanine violet
4½ pounds phthalocyanine blue
7½ pounds furnace black
2 pounds litharge A 7½ grind (Hegman gauge) was obtained in ¾ hour. The batch was reduced in situ by further addition of 65 gallons of varnish (1), 2½ gallons mineral spirits, ¾ gallon 6% cobalt drier and 19 gallons manganese drier solu. The batch completed, was filled directly from the mill for shipment.

(TEST B)

Steel shot replacement of glass—otherwise similar to Test A. Time to complete 20 minutes to 7½ grind.

(TEST C)

Manufacture of a similar quantity of the above enamel in a steel ball mill as conventionally employed required 30 hours ball mill time to complete.

The foregoing examples illustrate the tremendous time reductions possible with apparatus of this invention over conventional ball milling procedures.

A particular advantage has been gained in the batch mill as particularly described herein in that screen wear and screen plugging can be reduced to an absolute minimum by means as previously described whereby the fine grinding media, during the dispersion phase of breaking up pigment agglomerates and wetting the so-freed pigment particles with liquid, is acted upon by the impeller but the impeller energy thus transferred is not expended against the more delicate screen area. In one form of the invention, the screen is covered by a removable plate and in a second form of the invention, the impeller is lifted from its discharge position during the dispersion cycle of operation as previously described. Additionally, by employment of a frustro-conical or funnel-shaped chamber as described, the initial dispersing action, which acts on a limited volume, is most effective for that aspect of production while additional steps of product dilution, in the prior art completed in secondary vessels is now accomplished without loss of time or material and under conditions wherein the same energy input operates on larger volumes of product.

Those particularly skilled and familiar with the paint art will readily recognize many other advantages in meeting practical paint production problems with the unit and the process described.

What we claim is:

1. Apparatus for the manufacture of liquid dispersions of pigmentary solids in liquid vehicles which comprises a bottom plate of curved peripheral contour, the outer periphery of which extends divergently upwardly and outwardly to form a closed curvilinear wall originating from said plate to form a substantially frustro-conical chamber bottom, means for temperature control about said bottom chamber, a top chamber integral with said bottom chamber forming a liquid tight vessel, ingress means into the top chamber of said vessel, egress means adjacent said bottom plate in and through the bottom of the lower chamber side wall, a detachable frame adapted to cover said egress means, a horizontally slotted screen covering said frame, flow control means adapted to form a conduit exteriorly of the wall of the bottom vessel communicating with the chamber interior, said conduit locating and positioning said screened frame and terminating in an outlet port; a driven shaft rotatably suspended within said vessel, the lower end of which shaft terminates in an impeller disk coaxially affixed to said shaft, spaced above said base plate oppositely disposed from said screen frame, and within said bottom chamber said impeller disk of slightly less diameter than the bottom chamber base plate; means for elevating said impeller disk to a position above the level of the screen frame, and shaft driving means adapted to impart a peripheral speed to said impeller disk of at least about 2500 ft./minute.

2. Apparatus for the manufacture of liquid dispersions of pigmentary solids in liquids which comprises a liquid tight vessel, the bottom of which vessel is defined by a base plate of curvilinear periphery and the geometric form of said vessel originating from said base plate in such development that the area of said base plate is less than the area of any corresponding section formed by passing a plane parallel to said base plate through any point in said vessel above said base plate and within the area defined by the intersection of said plane with the so generated walls of said vessel, means for controlling the temperature within said vessel, ingress means into the top of said vessel, egress means adjacent said bottom plate in said vessel side wall, a detachable frame adapted to cover said egress means, a slotted screen covering said frame, flow control means adapted to form a conduit exteriorly of the wall of the vessel adjacent said bottom plate and about said screen frame communicating with the vessel interior, said conduit locating and positioning said screen frame and terminating in an outlet port defining said egress means, a driven shaft rotatably suspended within said vessel, the lower end of which shaft terminates in an impeller disc coaxially affixed to said shaft and spaced above said bottom plate and oppositely disposed from said screen frame, said disc of slightly less diameter than the bottom base plate, means of inhibiting directly aligned influence upon the screened frame area by said impeller disc and shaft driving means adapted to impart a peripheral speed to said impeller disc of at least about 2500 feet per minute.

3. Apparatus for the manufacture of liquid dispersions of pigmentary solids in liquids which comprises a liquid tight vessel, the bottom of which vessel is defined by a base plate of curvilinear periphery and the geometric form of said vessel originating from said base plate in such development that the area of said base plate is less than the area of any corresponding section formed by passing a plane parallel to said base plate through any point in said vessel above said base plate and within the area defined by the intersection of said plane with the so generated walls of said vessel, means for controlling the temperature within said vessel, ingress means into the top of said vessel, egress means in said vessel side wall adjacent said bottom plate, a detachable frame adapted to cover said egress means, a slotted screen covering said frame, flow control means adapted to form a conduit exteriorly of the wall of the vessel adjacent said bottom plate communicating with the vessel interior, said conduit locating and positioning said screen frame terminating in an outlet port defining the said egress means, a driven shaft rotatably suspended within said vessel, the lower end of which shaft terminates in a perforated impeller disc coaxially affixed to said shaft, spaced above said base plate, oppositely disposed from said screen frame, and within the bottom section of said vessel said impeller disc of slightly less diameter than the bottom base plate, means for vertical movement of said impeller shaft to a position such that the impeller disc is removed from alignment with said screen frame, and shaft driving means adapted to impart a peripheral speed to said impeller disc of at least about 2500 feet per minute.

4. The apparatus of claim 2 wherein the vessel described therein contains a volume of nodular grinding media of greater than 0.84 mm. but less than 1.68 mm. in diameter and a volume sufficient in amount to cover the impeller disc under static conditions.

5. The apparatus of claim 3 wherein the perforations of the impeller disc are cylindrical and the axes of said cylinders are at right angles to the top and bottom faces of the impeller.

6. The apparatus of claim 3 wherein the perforations of the impeller disc are cylindrical, forming ellipses with the top and bottom face of the impeller disc and the trailing edge of the ellipses so formed with the top face recedes downwardly and rearwardly trailing in the direction of rotation of said disc at an angle of about 45° to the impeller disc face.

7. Apparatus for the manufacture of liquid dispersions of pigmentary solids in liquids which comprises a liquid tight vessel, the bottom of which vessel is defined by a base plate of curvilinear periphery and the geometric form of said vessel originating from said base plate in such development that the area of said base plate is less than the area of any corresponding section formed by passing a plane parallel to said base plate through any point in said vessel above said base plate and within the area defined by the intersection of said plane with the so generated walls of said vessel, means for controlling the temperature within said vessel, ingress means into the top of said vessel, egress means adjacent said bottom plate in said vessel side wall, a detachable frame adapted to cover said egress means, a slotted screen covering said frame, flow control means adapted to form a conduit exteriorly of the wall of the vessel adjacent said bottom plate communicating with the vessel interior, said conduit locating and positioning said screen frame terminating in an outlet port defining said egress means, a driven shaft rotatably suspended within said vessel, the lower end of which shaft terminates in an impeller disc coaxially affixed to said shaft and spaced above said bottom plate and oppositely disposed from said screen frame, said disc of slightly less diameter than the bottom base plate, sliding plate means interiorly of said vessel adapted to be removably fitted over the inward side of said screen frame and egress means, said shaft driving means adapted to impart a peripheral speed to said disc impeller at least about 2500 feet per minute.

8. Apparatus for the manufacture of liquid dispersions of pigmentary solids in liquids which comprises a liquid tight, frusto-conical vessel, the bottom of which is defined by a base plate of curvilinear periphery of less area than any section formed by passing a plane parallel to said base plate through any point in said vessel above said base plate and within the area defined by the intersection of said plane with the upwardly divergent walls of said vessel, means for controlling the temperature within said vessel, ingress means into the top of said vessel, egress means adjacent said bottom plate in said vessel side wall, a detachable frame adapted to cover said egress means, a slotted screen covering said frame, flow control means adapted to form a conduit exteriorly of the wall of the vessel adjacent said bottom plate and about said screen frame communicating with the vessel interior, said conduit locating and positioning said screen frame and terminating in an outlet port defining said egress means, a driven shaft rotatably suspended within said vessel, the lower end of which shaft terminates in an impeller disc coaxially affixed to said shaft and spaced above said bottom plate and oppositely disposed from said screen frame, said disc of slightly less diameter than the bottom base plate, means of inhibiting directly aligned influence upon the screened frame area by said impeller disc and shaft driving means adapted to impart a peripheral speed to said impeller disc of at least about 2500 feet per minute.

References Cited in the file of this patent

UNITED STATES PATENTS

| | | |
|---|---|---|
| 1,997,301 | Kniffen et al. | Apr. 9, 1935 |
| 2,581,414 | Hochberg | Jan. 8, 1952 |
| 2,615,692 | Muller | Oct. 28, 1952 |
| 2,648,261 | Chaplin | Aug. 11, 1953 |